(12) United States Patent
Ong et al.

(10) Patent No.: US 11,500,440 B2
(45) Date of Patent: Nov. 15, 2022

(54) TRANSFERRING NETWORK INPUT/OUTPUT (I/O) DEVICE CONTROL OWNERSHIP BETWEEN HETEROGENEOUS COMPUTING ENTITIES

(71) Applicant: Intel Corporation, Santa Clara, CA (US)

(72) Inventors: Boon Leong Ong, Bayan Lepas (MY); Girish J. Shirasat, Glibert, AZ (US); Suraj A. Gajendra, Santa Clara, CA (US); Alok Anand, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 250 days.

(21) Appl. No.: 16/813,237

(22) Filed: Mar. 9, 2020

(65) Prior Publication Data

US 2020/0213413 A1  Jul. 2, 2020

Related U.S. Application Data

(60) Provisional application No. 62/819,323, filed on Mar. 15, 2019.

(51) Int. Cl.
*G06F 1/32* (2019.01)
*G06F 1/3206* (2019.01)
*G06F 1/3296* (2019.01)

(52) U.S. Cl.
CPC .......... *G06F 1/3206* (2013.01); *G06F 1/3296* (2013.01)

(58) Field of Classification Search
CPC .............................. G06F 1/3206; G06F 1/3296
See application file for complete search history.

(56) References Cited

U.S. PATENT DOCUMENTS

| | | | | |
|---|---|---|---|---|
| 2008/0148083 A1* | 6/2008 | Pesavento | ............. | G06F 1/3203 710/22 |
| 2010/0325463 A1* | 12/2010 | Lindsay | .................. | G06F 1/325 710/314 |
| 2016/0323148 A1* | 11/2016 | Butcher | .................. | H04L 47/78 |

OTHER PUBLICATIONS

"Wake-On-LAN", https://en.wikipedia.org/wiki/Wake-on-LAN, downloaded Mar. 2, 2020, 9 pages.

* cited by examiner

*Primary Examiner* — Stefan Stoynov
(74) *Attorney, Agent, or Firm* — Compass IP Law PC

(57) ABSTRACT

Examples include a computing system including a network input/output (I/O) device, the network I/O device including a microcontroller, a network controller, and a proxy mode monitor to enter a proxy mode by causing transfer of control of the network controller from a processor to the microcontroller without resetting the network controller, and to exit the proxy mode by causing transfer of control of the network controller from the microcontroller to the processor without resetting the network controller.

19 Claims, 10 Drawing Sheets

TRANSFERRING NETWORK INPUT/OUTPUT (I/O) DEVICE CONTROL OWNERSHIP BETWEEN HETEROGENEOUS COMPUTING ENTITIES

CROSS-REFERENCE TO RELATED APPLICATION

This application claims the benefit of U.S. Provisional Application No. 62/819,323, Mar. 15, 2019.

BACKGROUND

The field of invention relates generally to computing system architectures, and, more specifically, to transferring network I/O device control ownership between heterogeneous entities.

Some network I/O devices (such as network interface controllers (NICs)) have network proxy firmware that support at least a subset of protocols listed in the European Computer Manufacturers Association (ECMA) 393 standard called ProxZzzy® for Sleeping Hosts, $2^{nd}$ edition, June 2012. The ECMA 393 standard specifies maintenance of network connectivity and presence by proxies to extend the sleep duration of host computers. The standard specifies capabilities that a proxy may expose to a host computer, information that must be exchanged between a host computer and a proxy, proxy behavior for Institute of Electrical and Electronics Engineers (IEEE) 802.3 standard (Ethernet) and 802.11 standard (WiFi), and required and optional behavior of a proxy while it is operating, including responding to packets, generating packets, ignoring packets, and waking the host computer.

In some cases, implementing a network proxy agent on the network I/O device to fulfill requirements of the ECMA-393 ProxZzzy® for Sleeping Hosts standard is desired.

The processor in the network I/O device controls the media access control (MAC) controller within the network I/O device without the need to transfer ownership to a host processor. However, in some scenarios, transferring network I/O device control ownership between the host processor and a microcontroller in the network I/O device is desired.

DETAILED DESCRIPTION

Embodiments of the present invention comprise a computing system wherein a network controller (such as an Ethernet controller) in a network I/O device is enumerated and owned by a host processor at system initialization time. The passing of control of the network controller between the host processor and a microcontroller in the network I/O device is achieved by using a combination of software procedures and a hardware feature called a proxy mode register that changes the routing of direct memory access (DMA) operations and interrupts of the network I/O device.

In embodiments of the present invention, the passing of control does not require a reset of a MAC controller in the network I/O device and during the transition of control ownership, the MAC controller in the network I/O device is capable of receiving incoming frames inside the MAC controller's receive (Rx) buffer (e.g., thereby preventing packet drop during the transition).

Figure 1:
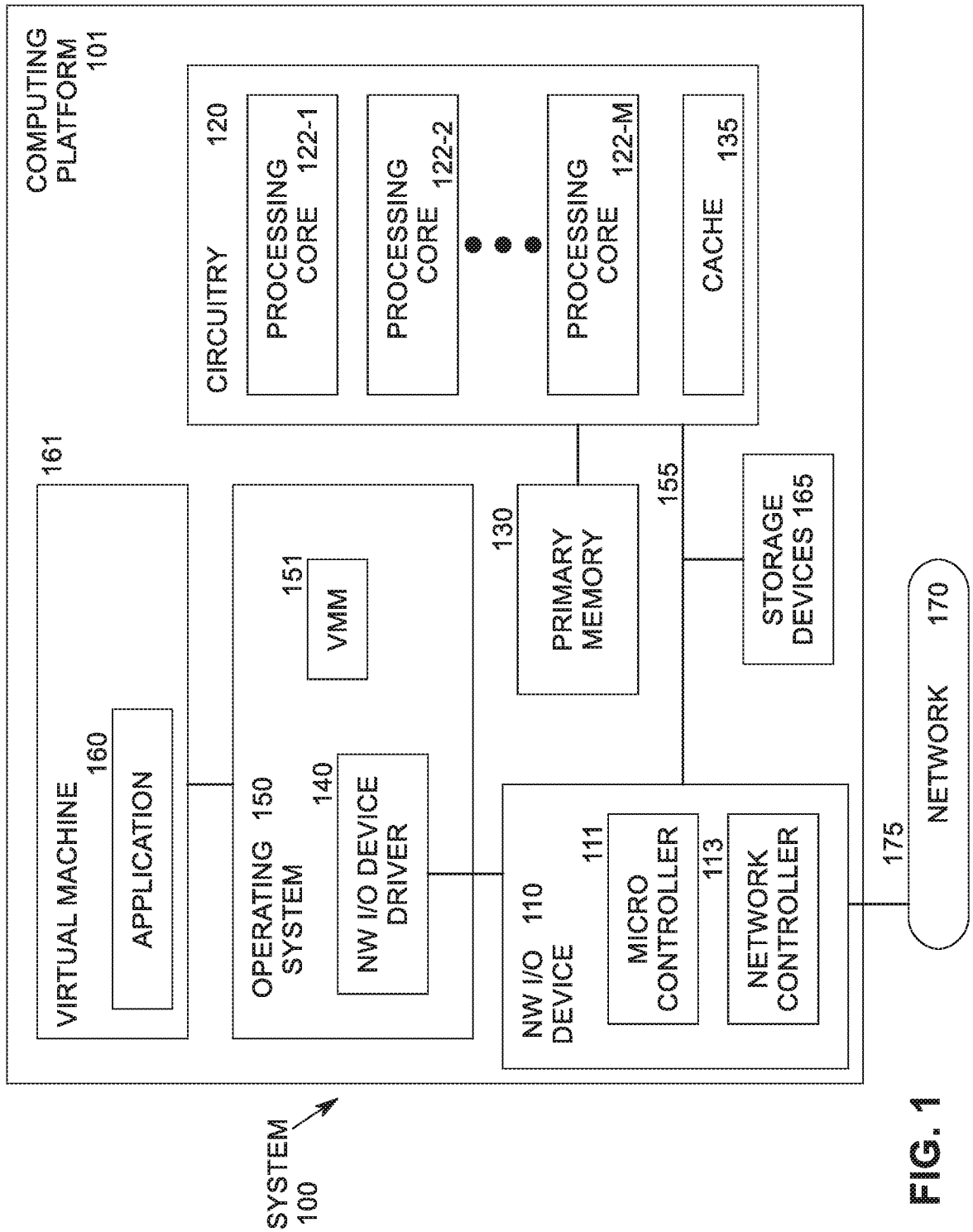
FIG. 1 illustrates an example computing system according to some embodiments.

FIG. 1 illustrates an example computing system 100. As shown in FIG. 1, computing system 100 includes a computing platform 101 coupled to a network 170 (which may be the Internet, for example). In some examples, as shown in FIG. 1, computing platform 101 is coupled to network 170 via network communication channel 175 and through at least one network (NW) input/output (I/O) device 110. In an embodiment, network I/O device 110 comprises a switch and/or a network interface controller (NIC) having one or more destination ports (not shown) connected or coupled to network communication channel 175. In an embodiment, network communication channel 175 includes a PHY device (not shown). In an embodiment, network I/O device 110 includes an Ethernet NIC. In an embodiment, network I/O device 110 includes a smart NIC, a baseboard management controller (BMC) or baseboard management system (BMS). Network I/O device 110 transmits data packets from computing platform 101 over network 170 to other destinations and receives data packets from other destinations for forwarding to computing platform 101. In an embodiment, network I/O device 110 includes a microcontroller 111 and a network (e.g., MAC) controller 113. In an embodiment, network controller 113 is an Ethernet controller.

According to some examples, computing platform 101, as shown in FIG. 1, includes circuitry 120, primary memory 130, operating system (OS) 150, NW I/O device driver 140, virtual machine manager (VMM) (also known as a hypervisor) 151, at least one application 160 running in a virtual machine (VM) 161, and one or more storage devices 165. In one embodiment, OS 150 is Linux™. In another embodiment, OS 150 is Windows® Server. Other OSs may also be used. Network I/O device driver 140 operates to initialize and manage I/O requests performed by network I/O device 110. In an embodiment, packets and/or packet metadata transmitted to network I/O device 110 and/or received from network I/O device 110 are stored in one or more of primary memory 130 and/or storage devices 165. In one embodiment, application 160 is a packet processing application operating in user mode.

In at least one embodiment, storage devices 165 may be one or more of hard disk drives (HDDs) and/or solid-state drives (SSDs). In an embodiment, storage devices 165 may be non-volatile memories (NVMs). In some examples, as shown in FIG. 1, circuitry 120 may communicatively couple to network I/O device 110 via communications link 155. In one embodiment, communications link 155 is a peripheral component interface express (PCIe) bus conforming to version 3.0 or other versions of the PCIe standard published by the PCI Special Interest Group (PCI-SIG). In some examples, operating system 150, NW I/O device driver 140, VM 161, and application 160 are implemented, at least in part, via cooperation between one or more memory devices included in primary memory 130 (e.g., volatile or non-volatile memory devices), storage devices 165, and elements of circuitry 120 such as processing cores 122-1 to 122-$m$, where "m" is any positive whole integer greater than 2. In an embodiment, OS 150, VMM 151, NW I/O device driver 140, VM 161 and application 160 are executed by one or more processing cores 122-1 to 122-$m$.

In some examples, computing platform 101, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, computing platform 101 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 120 having processing cores 122-1 to 122-$m$ may include various commercially available processors, including without limitation Intel® Atom®, Celeron®, Core (2) Duo®, Core i3, Core i5, Core i7, Itanium®, Pentium®, Xeon® or Xeon Phi® processors, ARM processors, processors from Applied Micro Devices (AMD) Incorporated, and similar processors. Circuitry 120 may include at least one cache 135 to store data. In one embodiment, circuitry 120 includes only one processing core.

According to some examples, primary memory 130 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 130 may include one or more hard disk drives within and/or accessible by computing platform 101.

Figure 2:
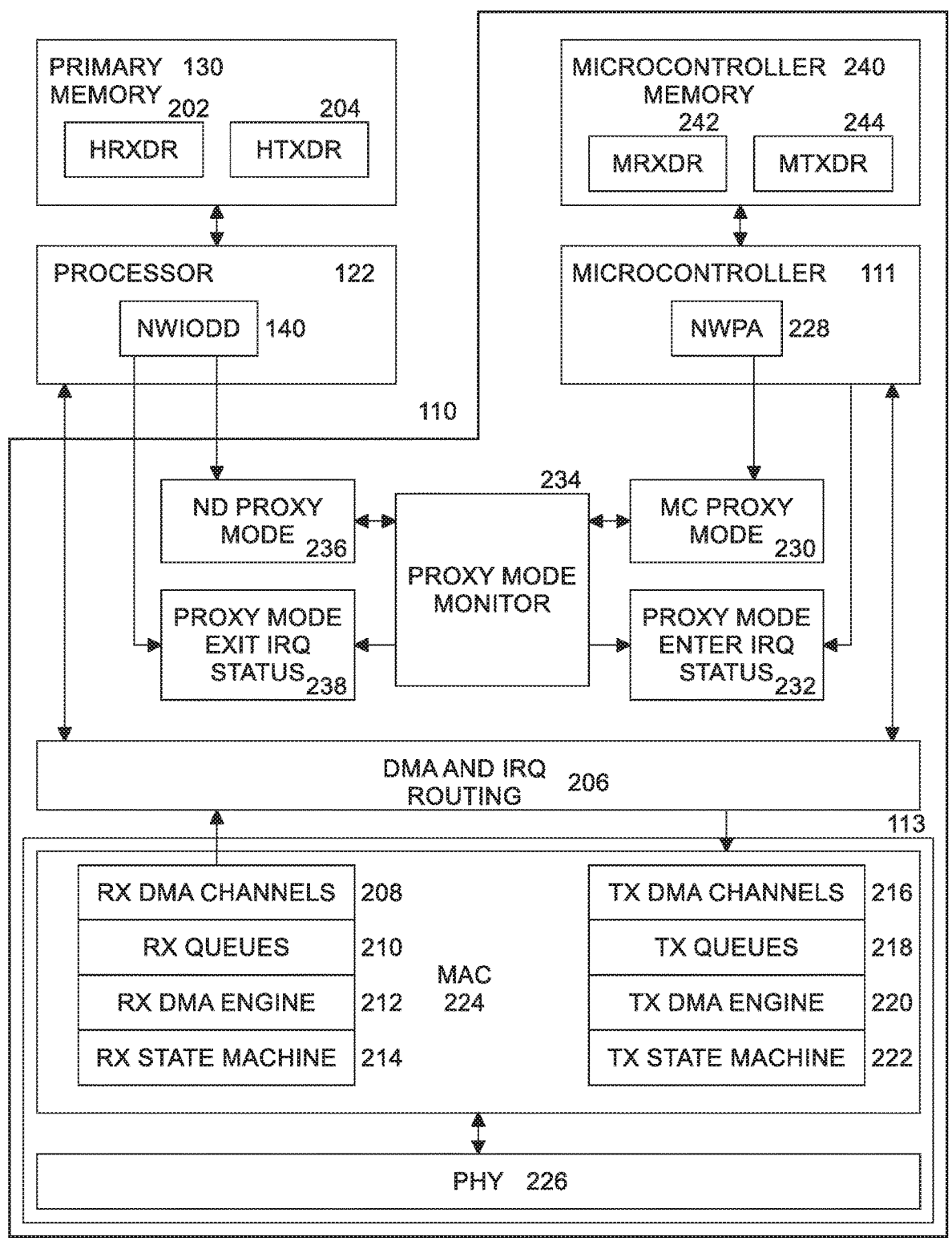
FIG. 2 illustrates an example of a network I/O device including a proxy mode for direct memory access (DMA) and interrupt request (IRQ) routing according to some embodiments.

FIG. 2 illustrates an example of a network I/O device 110 including a proxy mode for direct memory access (DMA) and interrupt request (IRQ) routing according to some embodiments. FIG. 2 shows example hardware design 200 according to some embodiments that allows control of ownership of the underlying network driver to be transferred between the host processor (e.g., 122-1 to 122-$m$ of FIG. 1) and microcontroller 111 in network I/O device 110 for implementing an ECMA-393 network proxy agent in network controller 113 (e.g., a lower power device). The transfer of control is accomplished without a reset of the network controller and without dropping packets.

When computing platform 101 is powered-up, network controller 113 in network I/O device 110 is enumerated and owned by one of host processor cores 122-1 . . . 122-$m$. Network device (ND) proxy mode register 236 is set as a default to "0" which causes all of the DMA and IRQ transactions to be routed between network controller 113 and host processor 122-1 . . . 122-$m$.

When application software 160 (or users) decide to put computing platform 101 into a low power mode, a network proxy agent (NWPA) 228 takes ownership of network I/O device 110.

The network proxy mode entry flow starts with network I/O device driver 140 disabling frame transmission in both transmit (Tx) DMA engine 220 and Tx state-machine 222. Receive (Rx) state machine 214 in network controller 113 remains enabled during the ownership change to allow more frames to be received and stored in Rx queues 210 in network controller 113. Only Rx DMA engine 212 in the network controller is disabled to stop Rx frames from being DMA transferred into host processor 122.

Embodiments of the present invention provide four registers for implementing proxy mode operations: 1) ND proxy mode register 236, 2) proxy mode exit IRQ status register 238, 3) microcontroller (MC) proxy mode register 230, and 4) proxy mode enter IRQ status register 232. Like other media access control (MAC) control and status registers of network I/O device 110 (not shown in FIG. 2), ND proxy mode 236 and proxy mode exit IRQ status 238 are memory mapped I/O (MMIO) mapped to host processor 122. MC proxy mode 230 and proxy mode enter IRQ status 232 are MMIO mapped to microcontroller 111. ND proxy mode 236 is set by network I/O device driver (NWIODD) 140 running in the host processor to indicate that the host processor wants to release the control of network controller 113 to microcontroller 111. Proxy mode monitor 234 relays the setting of ND proxy mode to 1 to microcontroller 111 by setting MC proxy mode 230 to 1 and proxy mode enter IRQ status 232 to 1. Proxy mode monitor 234, upon detecting MC proxy mode 230 equal to 1, changes the DMA & IRQ routing of network controller 113 to microcontroller 111. In an embodiment, the functionality of proxy mode monitor 234 may be implemented as firmware in network proxy agent (NWPA) 228 of microcontroller 111.

The setting of proxy mode enter IRQ status 232 triggers an interrupt to microcontroller 111. Firmware in microcontroller 111 (e.g., NWPA 228), upon wake-up from the interrupt, clears proxy mode enter IRQ status 232 before continuing with the proxy mode entry processing to put the computing platform 101 into a low power state (e.g., enters a S0ix state). TX DMA engine 220 and RX DMA engine 212 in network controller 113 are then configured to use Rx descriptor ring MRXDR 242 and Tx descriptor ring MTXDR 244 in microcontroller memory 240. Subsequently, a Tx path is re-started by enabling Tx state machine 222, and then Tx DMA engine 220. Since Rx state machine 214 is never disabled, the moment Rx DMA engine 212 is enabled, any frame received and stored in Rx Queues 210 of network controller 113 during the ownership change is immediately passed to microcontroller 111 (via DMA and IRQ routing 206) for further processing.

Figure 3:
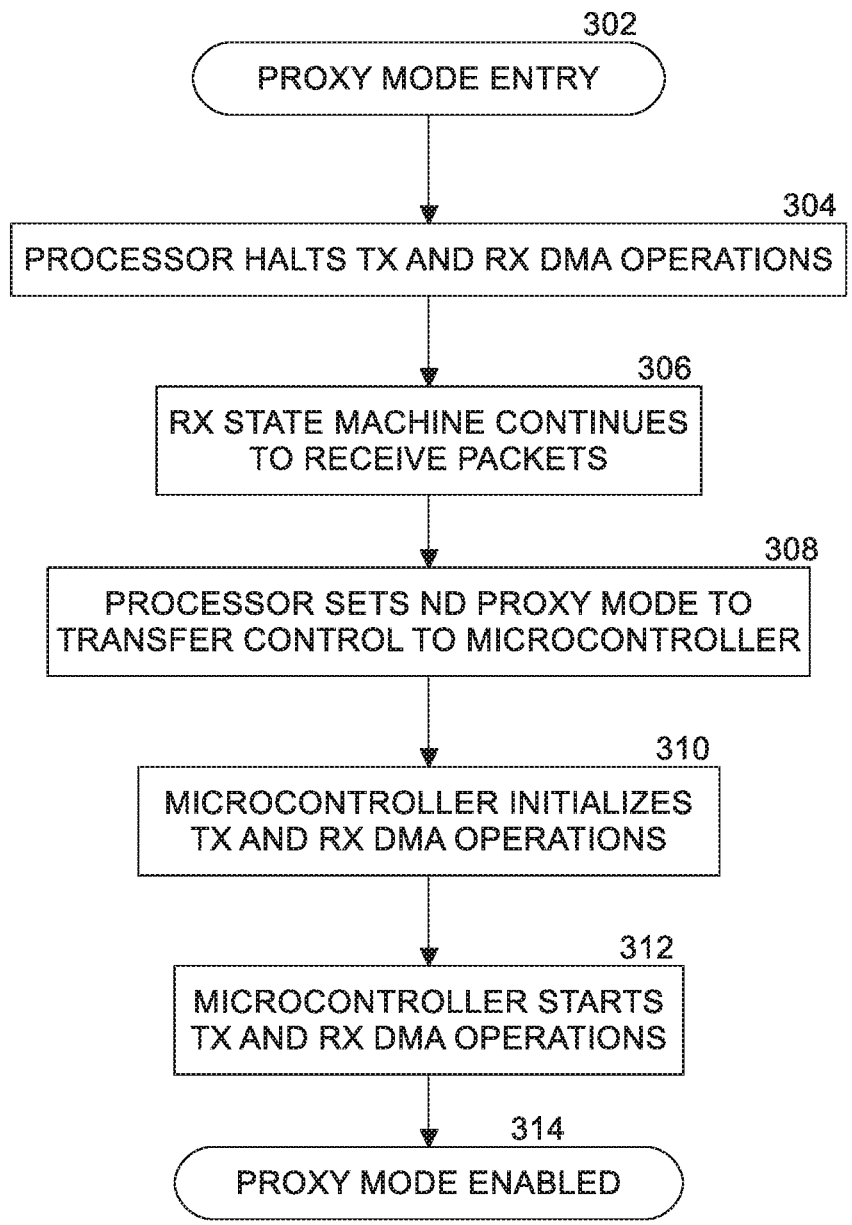
FIG. 3 is a flow diagram of network proxy mode entry processing according to some embodiments.

FIG. 3 is a flow diagram 300 of network proxy mode entry processing according to some embodiments. After proxy mode entry starts at block 302, at block 304 processor 122 (e.g., via NWIODD 140) halts Tx and Rx DMA operations. At block 306, Rx state machine 214 continues to receive packets. At block 308, processor 122 (e.g., via NWIODD 140) sets ND proxy mode 236 to one to transfer control to microcontroller 111. At block 310, microcontroller 111 (e.g., via NWPA 228) initializes Tx and Rx DMA operations. At block 312, microcontroller 111 (e.g., via NWPA 228) starts Tx and Rx DMA operations. Proxy mode is now enabled at block 314.

Figure 4:
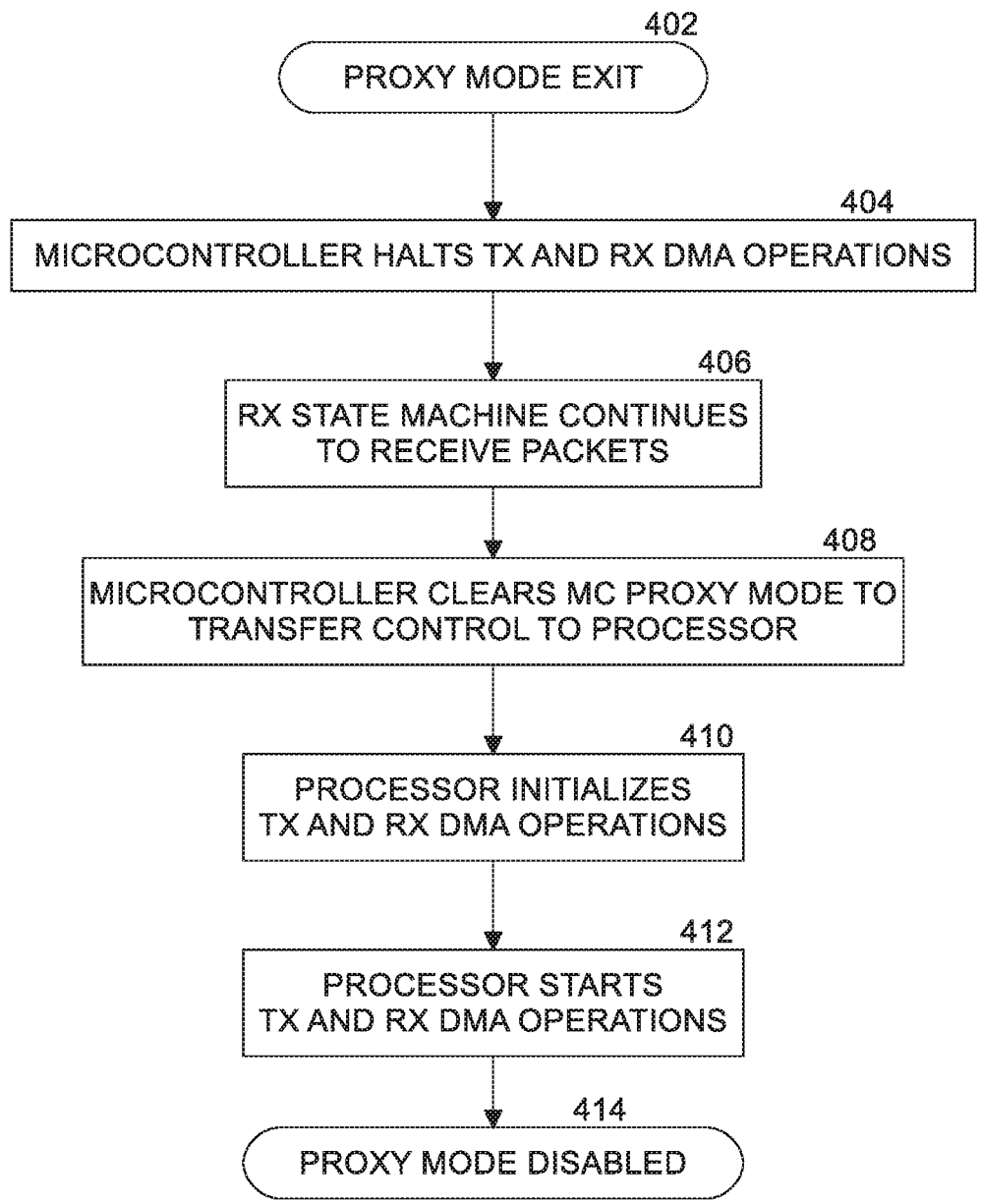
FIG. 4 is a flow diagram of network proxy mode exit processing according to some embodiments.

FIG. 4 is a flow diagram 400 of network proxy mode exit processing according to some embodiments. After proxy mode exit starts at block 402, at block 404 microcontroller 111 (e.g., via NWPA 228) halts Tx and Rx DMA operations. At block 406, Rx state machine 214 continues to receive packets. At block 408, microcontroller 111 (e.g., via NWPA 228) sets MC proxy mode 230 to zero (clears) to transfer control to processor 122. At block 410, processor 122 (e.g., via NWIODD 140) 111 initializes Tx and Rx DMA operations. At block 412, processor 122 (e.g., via NWIODD 140) starts Tx and Rx DMA operations. Proxy mode is now disabled at block 414.

Figure 5:
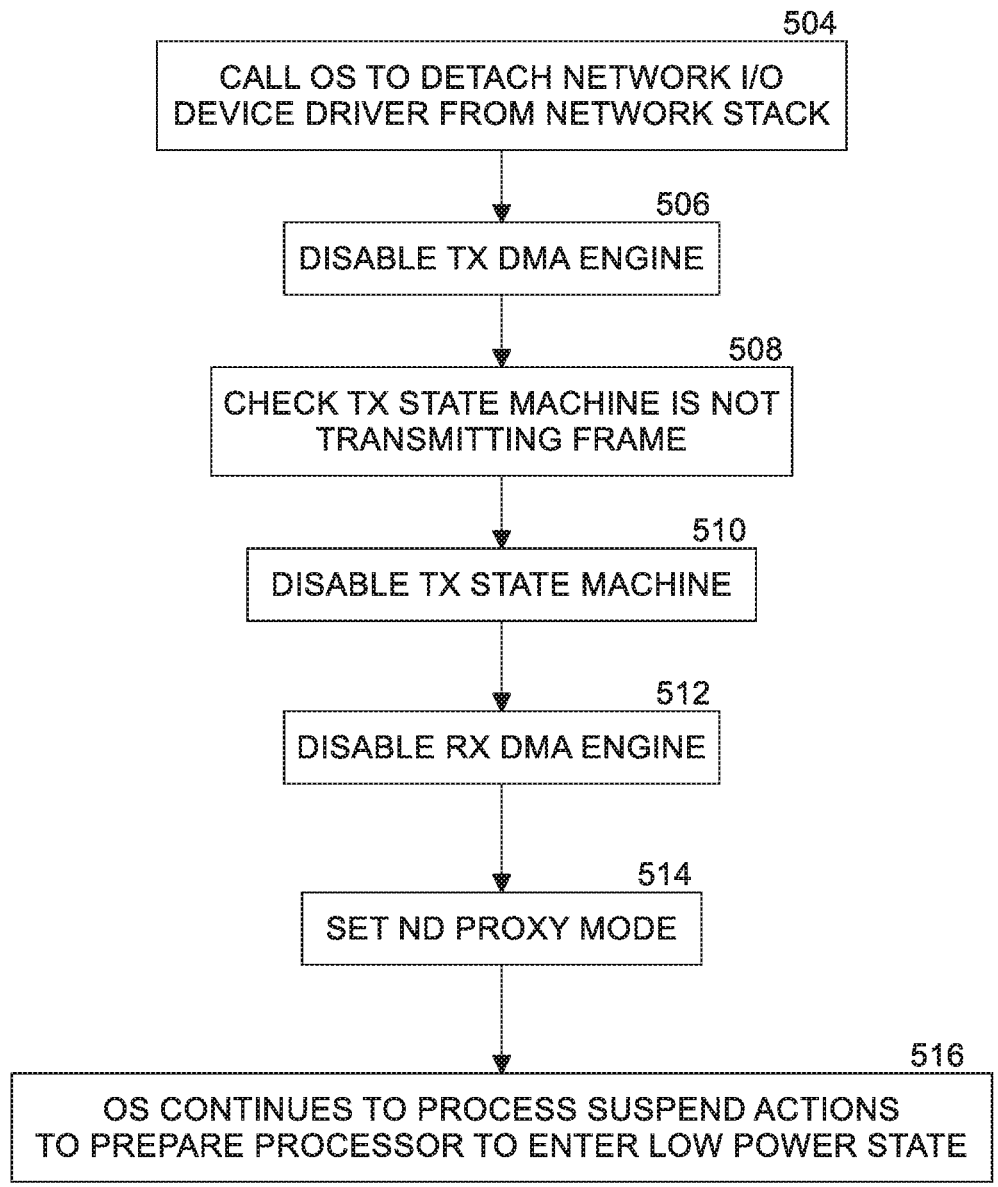
FIG. 5 is a flow diagram of network proxy mode entry processing of a network I/O device driver according to some embodiments.

FIG. 5 is a flow diagram 500 of network proxy mode entry processing of network I/O device driver (NWIODD) 140 according to some embodiments. Starting power management and entering a low-power state, is caused by either a user presses a button on the computing system or the OS detecting an idle status. The OS coordinates power management processing in part by calling NWIODD 140 to indicate entry into a low-power state. At block 504, the NWIODD calls OS 150 to detach the NWIODD from a network stack in the OS. At block 506, NWIODD 140 instructs network controller 113 to disable Tx DMA engine 220. At block 508, NWIODD 140 instructs network controller 113 to verify that Tx state machine 222 is not transmitting a frame. At block 510, NWIODD 140 instructs network controller 113 to disable Tx state machine 222. At block 512, NWIODD 140 instructs network controller 113 to disable Rx DMA engine 212. At block 514, NWIODD 140 sets ND proxy mode 236. At block 515, OS 150 running on host processor 122 continues to process suspend actions to prepare host processor 122 to enter a low power state (e.g., enter the S0ix state).

Figure 6:
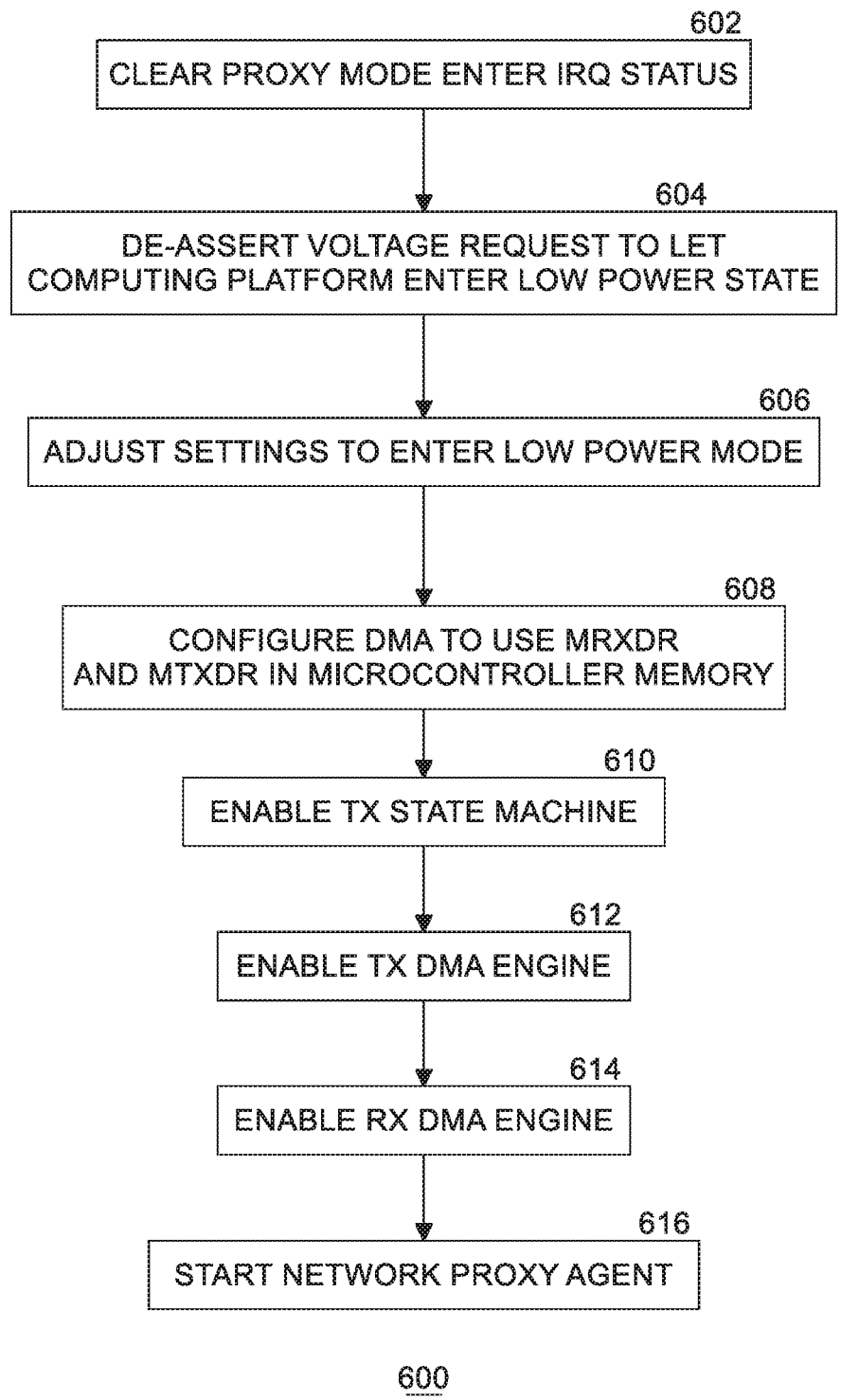
FIG. 6 is a flow diagram of network proxy mode entry processing of a microcontroller according to some embodiments.

FIG. 6 is a flow diagram 600 of network proxy mode entry processing of microcontroller 111 according to some embodiments. At block 602, microcontroller 111 clears proxy mode enter IRQ status 232. At block 604, microcontroller 111 de-asserts a voltage request to allow computing platform 101 to enter a low power state (e.g., enter the S0ix state). At block 606, microcontroller 111 adjusts settings to enter a low power mode. At block 608, microcontroller 111 configures DMA operations to use Rx descriptor ring MRXDR 242 and Tx descriptor ring MTXDR 244 in microcontroller memory 240. At block 610, microcontroller 111 instructs network controller 113 to enable Tx state machine 222. At block 612, microcontroller 111 instructs network controller 113 to enable Tx DMA engine 220. At block 614, microcontroller 111 instructs network controller 113 to enable Rx DMA engine 212. At block 616, microcontroller 111 starts network proxy agent (NWPA) 228. In an embodiment, NWPA 228 is implemented as firmware in the microcontroller that responds to network protocol queries such as those specified in ECM-93. Because the NWPA runs during the low power state in the microcontroller on behalf of the OS in the processor, it is called an "agent" or "proxy agent" herein. NWPA enables meeting an Energy Star power budget since the processor enters a low power state and the microcontroller is also operating at a low frequency. The protocols handling the low power state are implemented in firmware in one embodiment and can be expanded to cover other protocols (in other embodiments) subject to size constraints of the microcontroller's memory space.

When a packet of interest (e.g., a transmission control protocol (TCP) SYN of Internet Protocol (IP)) is received and detected by NWPA 228 at block 702, NWPA 228 releases ownership of network I/O device 110 (e.g., disables proxy mode).

The network proxy mode exit flow starts by causing computing platform 101 to exit the low power mode (e.g., enter the S0 state). When the computing platform is in the S0 state, the firmware of microcontroller 111 (e.g., NWPA 228) copies the packet of interest and all received frames into microcontroller memory 240. Subsequently, microcontroller 111 continues to disable the Tx path (e.g., disable the Tx DMA engine 220, then Tx state machine 222). As explained above, only the Rx DMA engine 212 is disabled and Rx state machine 214 remains enabled to allow frames to be received and stored inside Rx Queues 210 during the proxy mode exit transition. Next, microcontroller 111 clears the MC proxy mode register 230 and the change of value is relayed by proxy mode monitor 234 by setting ND proxy mode 236 to zero and proxy mode exit IRQ status 238 to 1. Proxy mode monitor 234 changes the DMA and IRQ routing 208 of network I/O device 110 when MC proxy mode 230 is set to 0.

The setting of proxy mode exit IRQ status 238 triggers an interrupt to host processor 122. When the host processor is woken up by the interrupt, network I/O device driver (NWIODD) 140 clears proxy mode exit IRQ status 238 and continues with the flow of network proxy exit processing by configuring Rx DMA engine 212 and Tx DMA engine 220 to use Rx descriptor ring HRXDR 202 and Tx descriptor ring HTXDR 204 in the host processor's primary memory 130. Next, NWIODD 140 reattaches itself to the OS's networking stack and passes the packets stored in microcontroller memory 240 to the OS's network stack for further processing. Lastly, NWIODD 140 enables the Tx path (e.g., TX DMA engine 220 and TX state machine 222) and Rx DMA engine 212 before resuming its normal (e.g., non-proxy) network operation.

Figure 7:
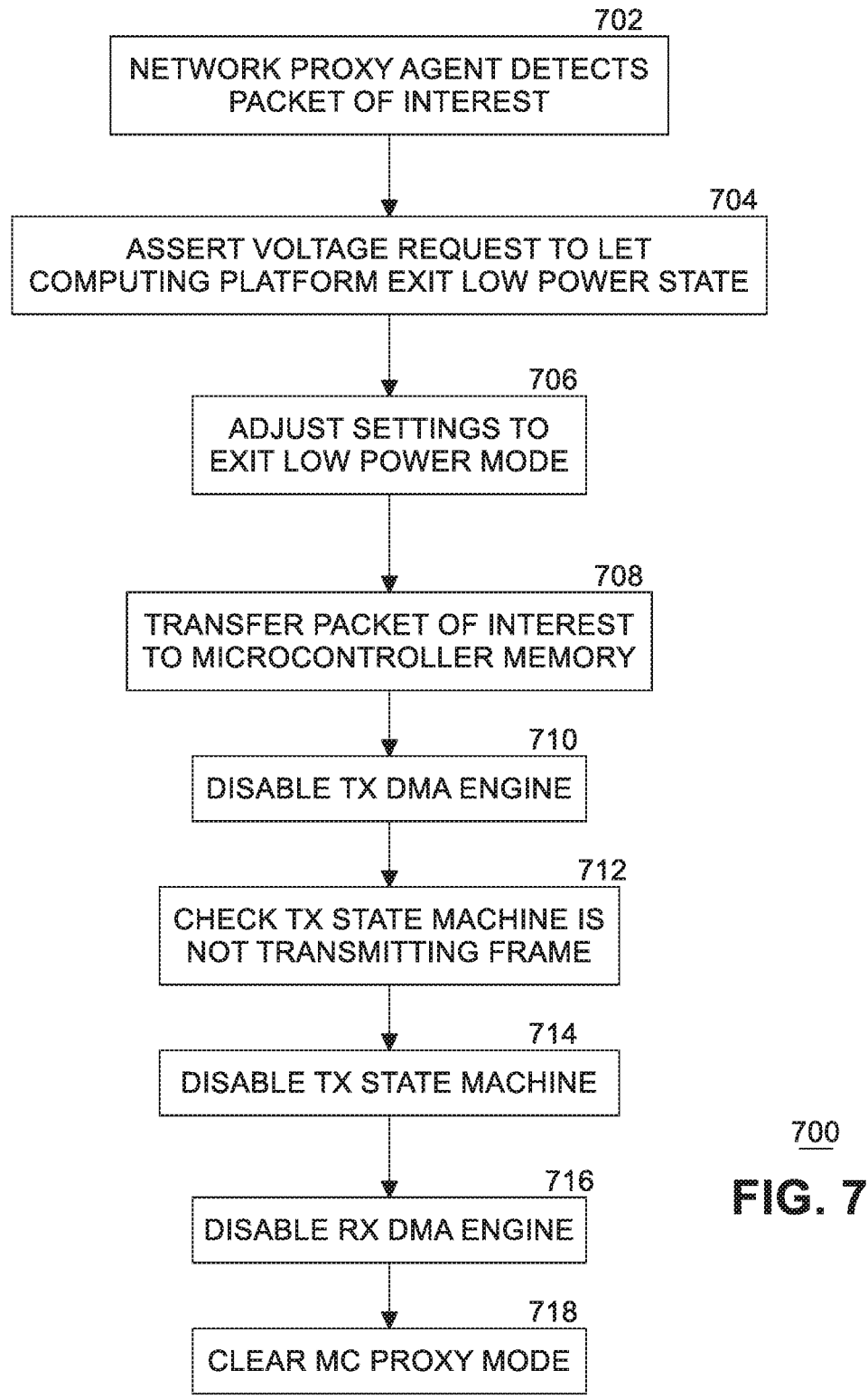
FIG. 7 is a flow diagram of network proxy mode exit processing of a microcontroller according to some embodiments.

FIG. 7 is a flow diagram 700 of network proxy mode exit processing of a microcontroller 111 according to some embodiments. At block 702, network proxy agent (NWPA) 228 running in microcontroller 111 detects a packet of interest. At block 704, microcontroller 111 asserts the voltage request to allow computing platform 101 to exit the low power mode (e.g., exit the S0ix state). At block 706, microcontroller 111 adjusts settings to exit low power mode. At block 708, microcontroller 111 transfers the packet of interest to microcontroller memory 240. At block 710, microcontroller 111 instructs network controller 113 to disable Tx DMA engine 220. At block 712, microcontroller 111 instructs network controller 113 to verify that Tx state machine 222 is not transmitting a frame. At block 714, microcontroller 111 instructs network controller 113 to disable Tx state machine 222. At block 716, microcontroller 111 instructs network controller 113 to disable Rx DMA engine 212. At block 718, microcontroller 111 clears MC proxy mode 230.

Figure 8:
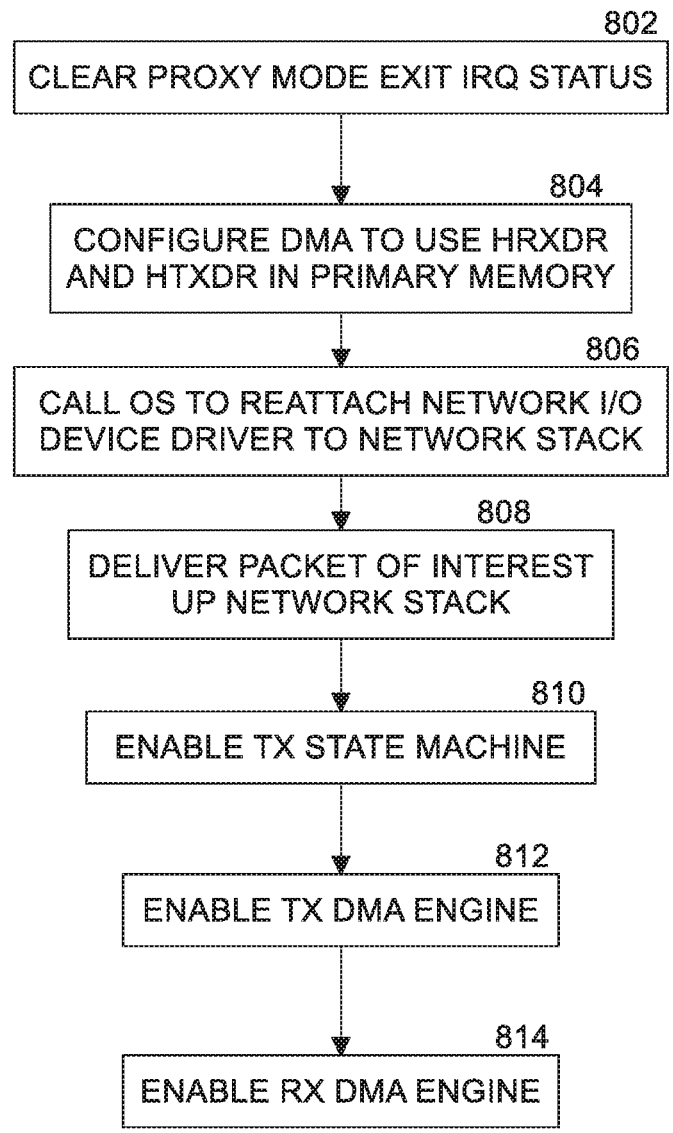
FIG. 8 is a flow diagram of network proxy mode exit processing of a network I/O device driver according to some embodiments.

FIG. 8 is a flow diagram 800 of network proxy mode exit processing of network I/O device driver (NWIODD) 140 according to some embodiments. At block 802, NWIODD 140 clears proxy mode exit IRQ status 238. At block 804, NWIODD 140 instructs network controller 113 to configure DMA to use Rx descriptor ring HRXDR 202 and Tx descriptor ring HTXDR 204 in primary memory 130. At block 806, NWIODD 140 calls OS 150 to reattach NWIODD 140 to the network stack. At block 808, NWIODD 140 delivers a packet of interest up the network stack. At block 810, NWIODD 140 instructs network controller 113 to enable Tx state machine 222. At block 812, NWIODD 140 instructs network controller 113 to enable Tx DMA engine 220. At block 814, NWIODD 140 instructs network controller 113 to enable Rx DMA engine 212. NWIODD 140 then continues with normal operation (e.g., non-proxy operation).

Figure 9:
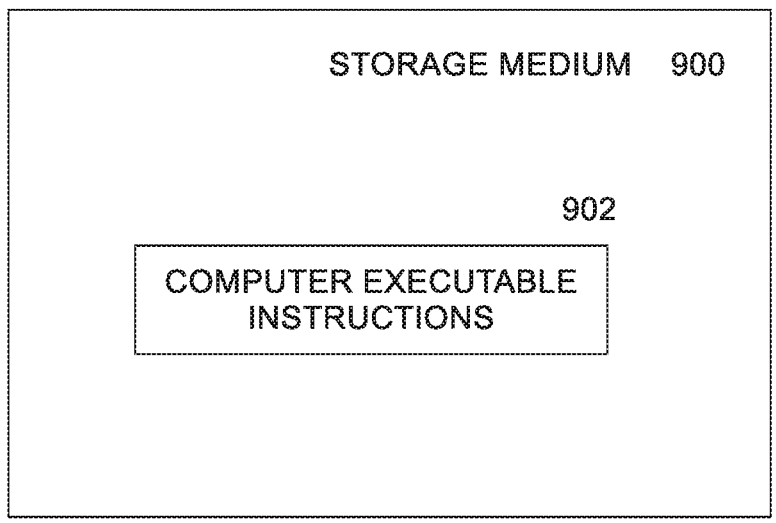
FIG. 9 illustrates an example of a storage medium.

FIG. 9 illustrates an example of a tangible storage medium 900. Storage medium 900 may comprise an article of manufacture. In some examples, storage medium 900 may include any non-transitory computer readable medium or machine readable medium, such as an optical, magnetic or semiconductor storage. Storage medium 900 may store various types of computer executable instructions, such as instructions 902 to implement logic flows described above. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
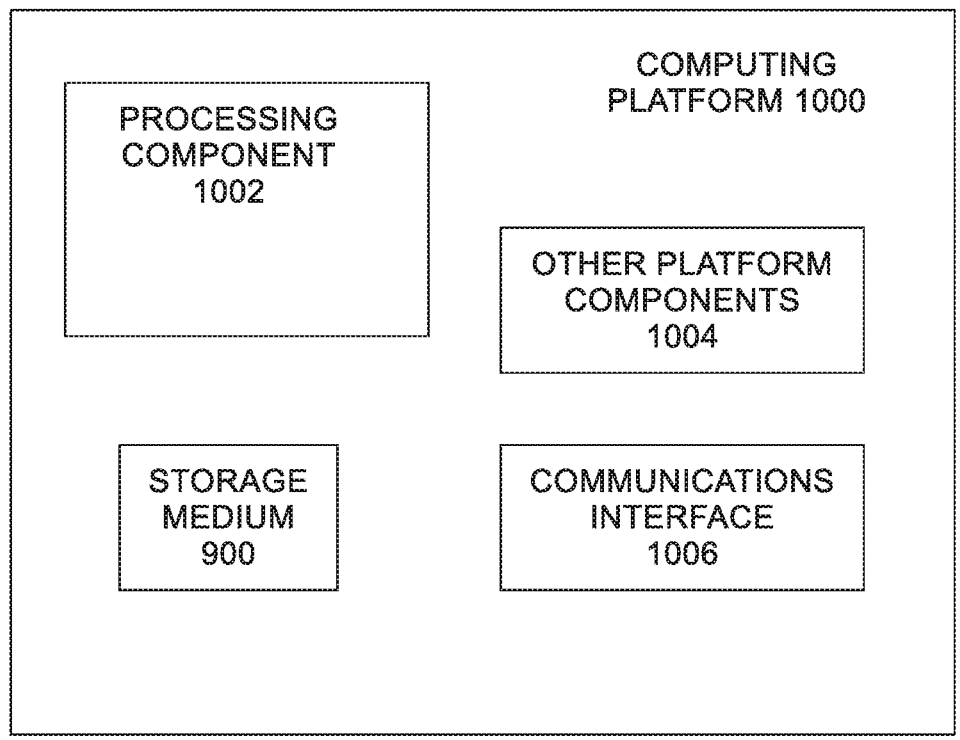
FIG. 10 illustrates an example computing platform.

FIG. 10 illustrates an example computing platform 1000. In some examples, as shown in FIG. 10, computing platform 1000 may include a processing component 1002, other platform components 1004 and/or a communications interface 1006.

According to some examples, processing component 1002 may execute processing operations or logic for instructions stored on storage medium 900. Processing component 1002 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1004 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1006 may include logic and/or features to support a communication interface. For these examples, communications interface 1006 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 1000, including logic represented by the instructions stored on storage medium 900 may be implemented using any combination of discrete circuitry, ASICs, logic gates and/or single chip architectures. Further, the features of computing platform 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1000 shown in the block diagram of FIG. 10 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A network input/output (I/O) device including a microcontroller comprising:
a network controller; and
a proxy mode monitor to enter a proxy mode by causing transfer of control of the network controller from a processor to the microcontroller without resetting the network controller, and to exit the proxy mode by causing transfer of control of the network controller from the microcontroller to the processor without resetting the network controller.

2. The network I/O device of claim 1, comprising a network device proxy mode register to indicate proxy mode entry when set by the processor and to indicate proxy mode exit when cleared by the microcontroller.

3. The network I/O device of claim 1, comprising a microcontroller proxy mode register to indicate proxy mode entry when set by the proxy mode monitor and to indicate proxy mode exit when cleared by the proxy mode monitor.

4. The network I/O device of claim 1, comprising a proxy mode enter status register to cause an interrupt to the microcontroller to enter the proxy mode when set by the proxy mode monitor.

5. The network I/O device of claim 1, comprising a proxy mode exit status register to cause an interrupt to the processor to exit the proxy mode when set by the proxy mode monitor.

6. A method comprising:
entering a proxy mode to transfer control of a network controller in a network input/output (I/O) device from a processor to a microcontroller in the network I/O device, without resetting the network controller, by detecting setting of a network device proxy mode register in the network I/O device by the processor, and setting a microcontroller proxy mode register in the network I/O device, and setting a proxy mode enter status register in the network I/O device to cause a first interrupt to the microcontroller to take control of the network controller, when the network device proxy mode register is set; and
exiting the proxy mode to transfer control of the network controller from the microcontroller to the processor, without resetting the network controller, by clearing the microcontroller proxy mode register and the network device proxy mode register, and setting a proxy mode exit status register in the network I/O device to cause a second interrupt to the processor to take control of the network controller.

7. The method of claim 6, comprising:
initializing transmit (Tx) and receive (Rx) direct memory access (DMA) operations by the microcontroller when entering the proxy mode; and
starting Tx and Rx DMA operations by the microcontroller when entering the proxy mode.

8. The method of claim 7, comprising halting Tx and Rx DMA operations by the microcontroller when exiting the proxy mode.

9. The method of claim 6, comprising continuing to receive packets by a receive (Rx) state machine in the network controller while entering the proxy mode and while exiting the proxy mode.

10. The method of claim 6, comprising clearing the proxy mode enter status register, de-asserting a voltage request to let a computing platform of the processor enter a low power state, and adjusting settings to enter a low power mode, when entering the proxy mode.

11. The method of claim 6, comprising configuring a memory in the microcontroller for use by transmit (Tx) and receive (Rx) direct memory access (DMA) operations when entering proxy mode.

12. The method of claim 6, comprising enabling a transmit (Tx) state machine of the network controller, enabling a Tx direct memory access (DMA) engine of the network controller, and enabling a receive (Rx) DMA engine of the network controller, when entering the proxy mode.

13. The method of claim 6, comprising asserting a voltage request to let a computing platform of the processor exit a low power state, and adjusting settings to exit a low power mode, when exiting the proxy mode.

14. The method of claim 6, comprising disabling a transmit (Tx) state machine of the network controller, disabling a Tx direct memory access (DMA) engine of the network controller, and disabling a receive (Rx) DMA engine of the network controller, when exiting the proxy mode.

15. A computer system comprising:
a processor; and
a network input/output (I/O) device including
a microcontroller;
a network controller; and
a proxy mode monitor to enter a proxy mode by causing transfer of control of the network controller from the processor to the microcontroller without resetting the network controller, and to exit the proxy mode by causing transfer of control of the network controller from the microcontroller to the processor without resetting the network controller.

16. The computer system of claim 15, the network I/O device comprising a network device proxy mode register to indicate proxy mode entry when set by the processor and to indicate proxy mode exit when cleared by the microcontroller.

17. The computer system of claim 15, the network I/O device comprising a microcontroller proxy mode register to indicate proxy mode entry when set by the proxy mode monitor and to indicate proxy mode exit when cleared by the proxy mode monitor.

18. The computer system of claim 15, the network I/O device comprising a proxy mode enter status register to cause an interrupt to the microcontroller to enter the proxy mode when set by the proxy mode monitor.

19. The computer system of claim 15, the network I/O device comprising a proxy mode exit status register to cause an interrupt to the processor to exit the proxy mode when set by the proxy mode monitor.

* * * * *